Patented May 19, 1953

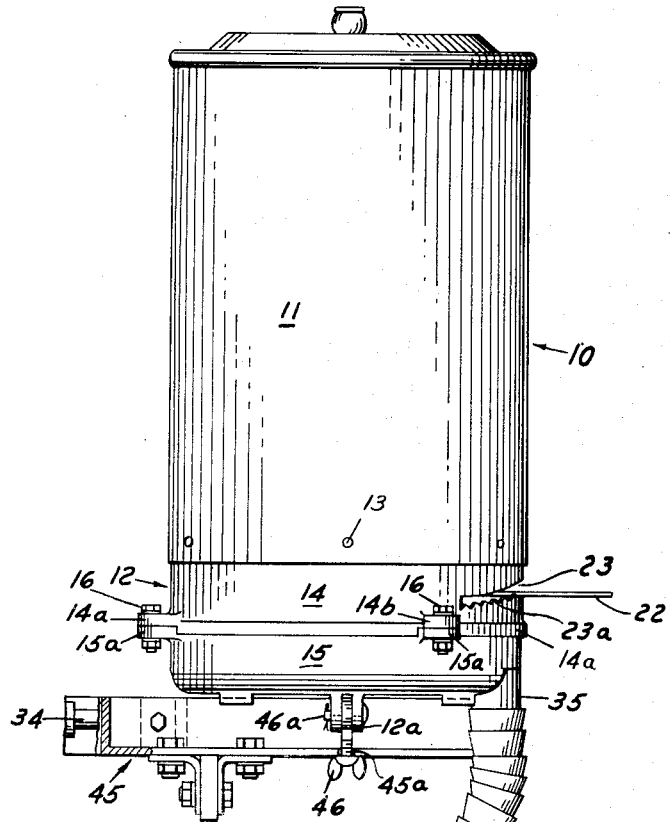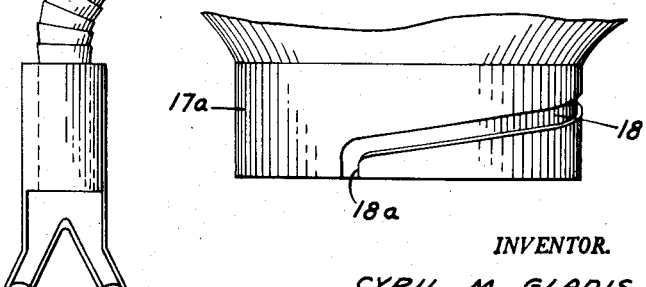

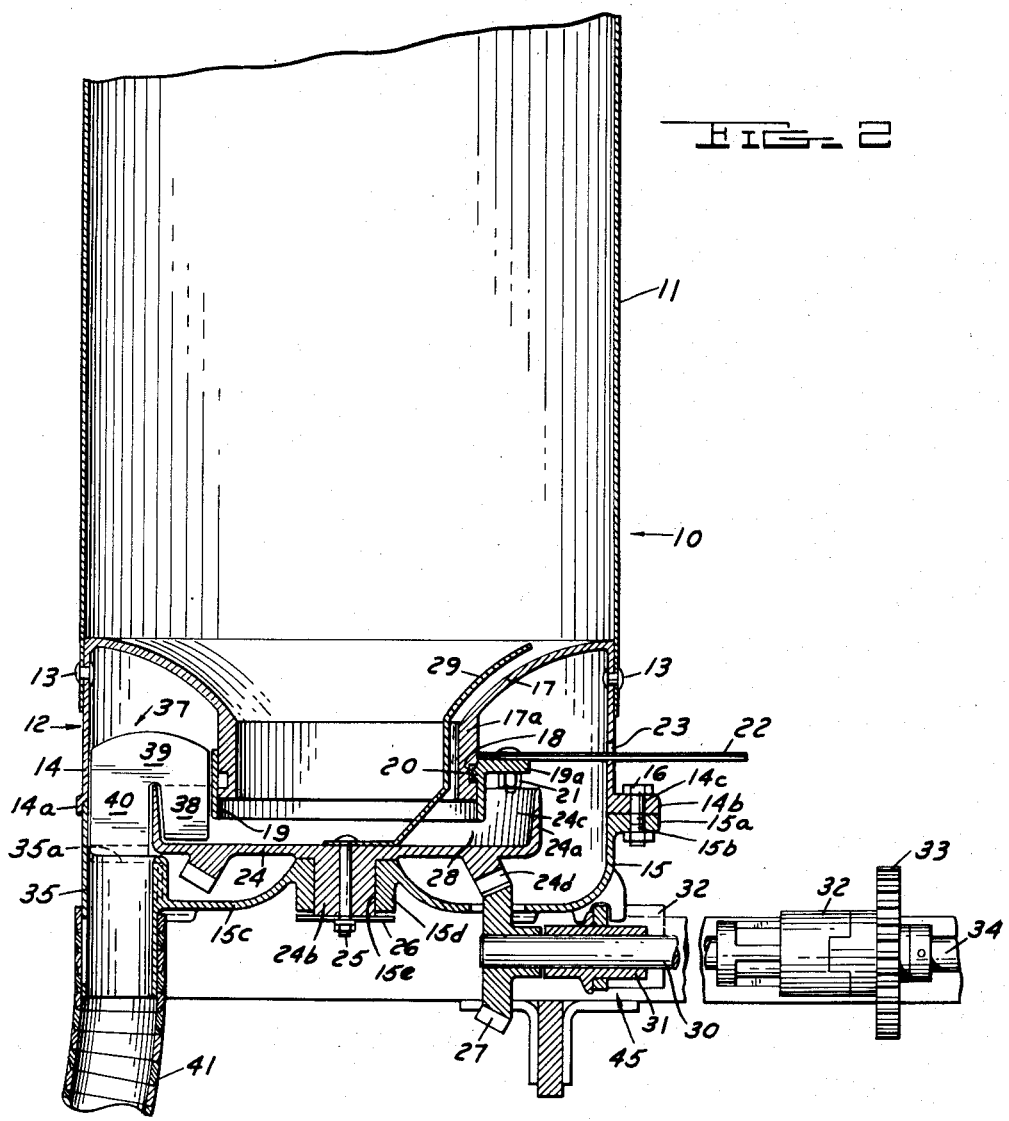

2,639,061

UNITED STATES PATENT OFFICE 2,639,061

FLOW ADJUSTING MEANS FOR FERTILIZER DISTRIBUTORS

Cyril M. Gladis, Butler, Pa., assignor, by mesne assignments, to Dearborn Motors Corporation, Highland Park, Mich., a corporation of Delaware Application January 31, 1950, Serial No. 141,460

2 Claims. (Cl. 222—285)

This invention relates to a device for selectively controlling the flow of fertilizer discharged from a fertilizer distributor.

It is now fairly well established that one of the most economical and productive methods of distributing fertilizer is in the furrow adjacent the seed being planted. The exact location of the fertilizer with respect to the seed varies somewhat with the type of seed being planted and the fertilizer to be applied; however, regardless of the type of seed being planted, a measured amount of fertilizer for the selected seed must be deposited. It is obvious that an inadequate amount of fertilizer deposited with the seed will not insure optimum plant growth while an excess of fertilizer deposited with the seed is not only wasteful but may be harmful to the proper germination of the seed. Of course, any fertilizer flow control device must permit easy and convenient adjustment in the field, and be of rugged construction to withstand the rough usage to which all farm implements are subjected.

Accordingly, it is an object of this invention to provide an improved fertilizer flow control device easily adjusted to accurately control the flow of fertilizer from a fertilizer hopper to the discharge tube.

A particular object of this invention is to provide a simple, rugged, economically manufacturable, granulated or powdered material flow control device for agricultural purposes.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side view of the assembled fertilizer distributor.

Figure 2 is a longitudinal sectional view of a fertilizer distributor incorporating the flow adjusting device of this invention.

Figure 3 is a fragmentary detail view showing the configuration of the cam slot provided on the funnel portion of the fertilizer distributor.

As shown on the drawings:

In Figure 1 and 2 there is shown a fertilizing attachment or distributor 10 which may be mounted on a corn planter or other type of seed planting machine (not shown). The fertilizing attachment 10 comprises a base portion 12 and a substantially cylindrical hopper 11. Base portion 12 consists of superimposed, cylindrically shaped castings comprising an upper section 14 and a bottom cup-like section 15. Hopper 11 is of tubular construction and fits over the upper section 14 and is secured thereto by a plurality of radially disposed bolts or rivets 13. A flange 14a is provided on the bottom edge of section 14 which overlaps the top of the bottom section 15. A plurality of lugs 14b are provided in spaced relationship about the lower edge of upper section 14 and corresponding lugs 15a are provided on the upper portion of the bottom section 15 in opposed relationship to lugs 14b. A vertically disposed hole 14c in lugs 14b is aligned with a corresponding hole 15b in the respective lug 15a through which a bolt 16 is inserted to secure sections 14 and 15 together. The fertilizer distributor is mounted on an angle iron frame 45 which in turn may be secured to a planter or other implement (not shown). A plurality of pairs of spaced integral depending lugs 12a are disposed about the bottom of base 12 and a wing bolt 46 pivotally secured between each pair of lugs 12a by a pin 46a cooperates with a slot 45a in frame 45 to secure the fertilizer distributor to frame 45.

A substantially inverted conical shaped funnel portion 17 is integrally formed within the upper section 14 of base 12 and is concentrically disposed therein. The funnel portion 17 terminates in a vertically disposed cylindrical neck portion 17a. At least one helical groove 18 is provided on the exterior surface of the cylindrical neck portion 17a and terminates in a vertical groove 18a which communicates with the bottom edge of neck portion 17a for a purpose to be presently explained. A metering collar 19 surrounds neck 17a and an inwardly radially projecting, lug 20 is provided on the interior of collar 19 to cooperatively engage each helical groove 18, such lug being engageable therein when the collar 19 is assembled to neck 17a from the bottom thereof by lug 20 passing up along vertical groove 18a.

A radially disposed outwardly projecting lug 19a is provided on collar 19 to which there is horizontally secured a handle 22 by a bolt 21 and such handle projects outwardly through a helical slot 23 provided in the wall of upper base section 14, slot 23 being provided with the same helical lead as grooves 18. Handle 22 is spring tempered and so shaped as to permit it to resiliently bear against the bottom of slot 23. A plurality of notches 23a are provided on the bottom surface of slot 23 wherein handle 22 may be engaged in any selected notch to lock such handle in a desired location whereby the rate of flow of fertilizer from the hopper may be controlled as will be later explained.

The bottom 15c of section 15 defines an integral central hub 15d having an axial bore 15e. A dish-like feeding member 24, provided with an upturned sidewall 24a, is rotatably mounted on top of hub 15d, an integral axial, depending hub portion 24b of such dish-like member cooperating with hole 15e in bearing relationship for such mounting. Feeding member 24 is rotatably secured within hole 15e by a bolt 25 and a washer 26, such washer being adjacent the underside of hub 15d whereby axial displacement of member 24 is prevented. An integral bevel gear ring 24d is formed on the underside of dish 24 which cooperates with a bevelled gear 27 as will be presently explained.

The sidewalls 24a of feeding member 24 substantially surround collar 19; however as the diameter of walls 24a is substantially larger in diameter than collar 19, an annular opening 24c is defined between such two members. An annular orifice 28 is defined when collar 19 is raised above the bottom of dish 24 to permit fertilizer to flow out of hopper 10 as will be described. A rod-like fertilizer agitator 29 is secured at one end underneath the head of bolt 25 while the other end of such agitator slopes upwardly and outwardly as shown in Figure 2 to substantially conform to the shape of funnel portion 17. Agitator 29 rotates with dish 24 to break up lumps of fertilizer thereby insuring an even downward flow of fertilizer.

Bevel gear 27 is secured on the left hand end of a horizontally disposed shaft 30, such shaft being journaled at its left hand end within a bearing 31 supported within a housing 32 mounted on the frame 45 of the fertilizer attachment. The right hand end of shaft 30 is connected to a sprocket 33 by a coupling 32 and such sprocket is connected to a second shaft 34 which in turn may be connected to a second fertilizer attachment. Sprocket 33 is driven by a chain (not shown) from a ground wheel, or the like.

A cylindrical tube 35 is integrally formed on the left hand side of bottom section 15 of base 12, as best shown in Figure 2. The upper end of tube 35 defines a discharge orifice 35a and a fertilizer deflector plate 37 is mounted in upper base section 14 directly opposite orifice 35. Deflector 37 is provided with a scoop portion 38 which projects into feeding member 24 and fits relatively snugly between collar 19 and the sidewalls 24a and in close proximity to the bottom of feeding member 24. Deflector 37 is also provided with a bight portion 39 integrally formed with scoop 38 and depending from such bight portion is a deflector portion 40 which communicates with orifice 35a. Thus when feeding member 24 is rotated by bevel gear 27, any fertilizer contained in annular channel 24c will strike scoop 38 and then be forced over the edge 24a of dish 24 against deflector 40 whereupon gravity causes the fertilizer to flow downwardly through orifice 35a and into tube 35. A flexible hose 41 is connected to cylindrical tube 35 through which the fertilizer may be directed downwardly to the furrow opening boot or where it is desired to deposit such fertilizer in the ground.

By reference to Figure 2, it will be readily appreciated that the amount of material escaping underneath collar 19 through orifice 28 can be conveniently controlled by varying the height of such collar relative to the bottom of dish 24. Helical groove 18 accomplishes this adjustment in a highly satisfactory manner by the cooperation of lug 20 with groove 18 and the height of the lower edge of collar 19 with respect to the bottom of rotating dish 24 may then be varied from a closed position upwardly to a very substantial opening. A plurality of notches 23a are provided along the bottom of slot 23 and handle 22 may be selectively engaged in any one of such notches to yieldingly secure such handle in a selected position of adjustment of collar 19. Thus the spacing of collar 19 relative to dish 24 may be conveniently controlled from the outside of base 14 by handle 22.

From the foregoing description it will be clearly apparent that there is here provided a simple but positive device for regulating the flow of fertilizer in a fertilizer distributor which is readily and easily adjustable whereby the amount of fertilizer to be deposited in or adjacent to the seed furrow can be accurately metered. Further, any selected setting of the flow regulating device of this invention is positively locked by the adjusting handle.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a fertilizer distributor, a hollow base element, side walls mounted on said base element defining a hopper for granulated fertilizer, a cup-shaped member rotatably mounted on said base element, a funnel-shaped member mounted in said base element above said cup member and having a stem portion projecting into said cup member but being axially spaced above the bottom of said cup-shaped member, a sleeve-like valve member helically adjustably mounted on said stem portion of the funnel-shaped element and cooperating with the bottom of said cup-shaped member to define a variable width, annular orifice to control fertilizer flow from said stem portion into the outer peripheral portions of said cup-shaped member, said base element having a helically extending slot formed in the wall thereof, at least one of the helical walls of said slot having a plurality of spaced notches formed therein, and a resilient operating arm secured in radial relationship to said sleeve-like valve member and projecting through said aperture, said operating arm being resiliently engageable with any selected one of said notches to retain said valve member in any selected axial position.

2. The combination defined in claim 1 wherein said stem portion of the funnel-shaped element has at least one helical groove formed therein, said helical groove terminating in a vertical groove extending to the bottom edge of said stem portion, and said sleeve-like valve member having an inwardly projecting lug engageable in said helical groove and also cooperable with said vertical groove to permit assembly of said sleeve-like valve member on said stem portion of said funnel-shaped element.

CYRIL M. GLADIS.

References Cited in the file of this patent

UNITED STATES PATENTS

| Number | Name | Date |
|---|---|---|
| 55,872 | Hutchinson | June 26, 1866 |
| 897,456 | Cole | Sept. 1, 1908 |
| 1,104,288 | Beskow et al. | July 21, 1914 |
| 1,764,108 | Kennedy | June 17, 1930 |
| 2,329,948 | Shallock | Sept. 21, 1943 |